United States Patent Office 3,513,694
Patented May 26, 1970

3,513,694
TENSILE TESTING
Bernard S. Baker, 316 Broad Lane,
Coventry, Warwickshire, England
No Drawing. Filed May 8, 1968, Ser. No. 727,717
Claims priority, application Great Britain, May 10, 1967,
21,688/67
Int. Cl. G01n 3/08
U.S. Cl. 73—95.5                                    1 Claim

ABSTRACT OF THE DISCLOSURE

A method of carrying out a tensile test on a sample of filamentary material comprising attaching the sample at two positions spaced along its length to the relatively movable upper and lower arms of a tensile testing machine, moving the arms towards each other to remove any tension in the sample, thereby enabling the initial load on the upper arm to be measured, moving the arms away from each other to a position at which the sample is subjected to a predetermined tensile force, as measurable by the load on the upper arm, which enables the test length of the sample to be measured in terms of the separation of the arms, and moving the arms further away from each other to extend the sample until it breaks, at which position the separation of the arms is measurable to determine the extension of the sample at breakage and the load on the upper arm is measurable to determine the breaking load of the sample by subtraction therefrom of the initial load.

---

This invention relates to the determination of the tensile properties of filamentary materials, in particular textile filamentary materials including filaments, fibres, yarns and threads.

The determination of the tensile properties of a filamentary material is normally accomplished by attaching the ends of a short sample of the material to clamps on relatively movable arms and then moving the arms apart until the sample breaks at which point the force necessary to break the sample is measured and also the degree of extension of the sample.

The attachment of the ends of a sample of a filamentary material to the clamps on the relatively movable arms is commonly accomplished by firstly gripping one end of the sample between the jaws of a clamp on the upper arm and then attaching a weight to the free end of the sample so as to remove from it any crimps it may have and finally gripping the sample at a point above the weight between the jaws of a clamp on the lower arm so as to clamp a predetermined test length between the two clamps. The clamps are then moved apart to stretch the sample by downward movement of the lower clamp arm until the sample breaks. This procedure is not as accurate as could be desired, particularly when testing samples with low breaking loads, and is unnecessarily time consuming. Additionally the samples are often damaged due to their excessive handling.

According to the present invention a method of determining the tensile properties of a sample of a filamentary material comprises the steps of:

(1) Attaching the free ends of a sample of a filamentary material to two relatively movable arms of a tensile testing apparatus, (2) Moving the arms towards each other so as to remove any tension there might be in the sample, thereby enabling the initial load on the upper arm due to its mass and that of the sample to be measured, (3) Moving the arms apart to a point where the sample is subjected to a predetermined force, as measurable by the load on the upper arm, which enables the test length of the sample between its attached ends to be measured in terms of the separation of the arms, and (4) Moving the arms further apart to extend the sample to the point where it breaks, at which point the separation of the arms is measurable to determine the extension of the sample at breakage and the load on the upper arm is measurable to determine the breaking load of the sample by subtraction therefrom of the initial load.

Use of this method of determining the tensile properties of a sample of filamentary material enables extremely accurate results to be obtained for both the breaking load and extension as the initial load and the test length of the sample may both be measured accurately before extension of the sample commences.

The invention includes an apparatus for determining the tensile properties of a sample of a filamentary material by the method described above.

Such an apparatus preferably incorporates the features of the inventions described in the specifications of co-pending U.S. patent application Ser. Nos. 655,018, 655,012 and 655,011, filed July 21, 1967. Of these applications, the first numbered relates to an apparatus for applying a predetermined load to an article and may thus be used for accomplishing step (3) of the method of the present invention, that is for applying what is termed the "pretensioning" lead to the sample. The second and third number applications relate to the measurement of loads and lengths, respectively, by the use of electric apparatus and can be used, in the case of U.S. patent application Ser. No. 655,012, filed July 21, 1967, for the measurement of the breaking load of a sample of a filamentary material by subtracting from the load on the upper arm at breakage the initial load on the arm and, in the case of U.S. patent application Ser. No. 655,011, filed July 21, 1967, for the measurement of the percentage extension of the sample, by comparison between the positions of the lower arm relative to that of the upper arm at sample breakage and when the sample is under only the pretensioning load.

Although there is normally a pause between steps (2) and (3) whilst the load on the upper arm is measured, steps (3) and (4) may be accomplished without a pause between them if the response of the apparatus is sufficiently rapid.

To facilitate the attachment of the samples of filamentary materials onto the relatively movable arms of the tensile testing apparatus it is preferred that the samples should firstly be mounted onto a paper tape of the type described in the specification of copending patent application No. 727,402 of even date. The tape has a ladder-like form and is adapted to hold samples having predetermined lengths across holes in the tape. The tape is particularly adapted for automatic loading of the samples, when on the tape, onto the relatively movable arms of a tensile testing apparatus, by an apparatus constructed as described with reference to the specification of copending patent application No. 727,766, filed May 9, 1968.

The method of the present invention is illustrated by way of example, by the following description of the sequence of operations for determining the tensile properties of a filamentary material.

A nylon staple fibre of 4½ denier was loaded onto a ladder-like paper tape as shown in FIG. 1 of the drawings accompanying the specification of copending patent application No. 727,402, of even date, using the apparatus described with reference to FIG. 2 of the drawings accompanying that specification. The nominal length of the staple fibre was approximately 2 cms., that is the distance between the continuous side strips of the tape. The length of tape bearing the staple fibre was loaded into a container which was subsequently fitted to an apparatus for attaching the staple fibre, whilst mounted on the tape, onto the relatively movable clamp arms of a tensile testing apparatus. The apparatus for so attaching the staple fibre to the clamp arms was of the type described with reference to the drawings accompanying the specification of copending patent application No. 727,766, filed May 9, 1968. Clamps on the arms of the tensile testing apparatus were then manually brought into operation to clamp the staple fibre over the tapes on which it was mounted.

The lower clamp arm was then moved upwards by a distance of 2 mm., so as to remove any tension there might have been in the staple fibre. The load on a load cell to which the upper clamp arm was attached was then measured in terms of the voltage of an electrical signal generated by the load cell.

The lower clamp arm was then moved downwards to the point where a predetermined pretensioning load of 0.25 gram was applied to the staple fibre. This point was determined electrically, by the use of the apparatus described in the specification of copending U.S. patent application Ser. No. 655,018, filed July 21, 1967, from the signal generated by the load cell.

At the instant when the pretensioning load was applied to the staple fibre, at which point any crimps it may have had in the completely relaxed state were straightened out, the position of the lower clamp arm, in relation to that of the upper clamp arm, was measured in terms of the voltage of an electrical signal derived from a potentiometer connected to the lower arm. This gave an electrical signal having a voltage corresponding to the test length of the sample.

Movement of the lower clamp prior to pretension was accomplished at a progressively increasing speed controlled electrically by a part of the apparatus constructed as described in the specification of copending British patent application No. 55,024/66. After pretension, however, extension of the staple fibre was continued without pause towards the point of its breakage, by moving the lower clamp arm further downwards at the speed it had reached at the instant of pretension. The speed of the lower clamp arm after pretension was controlled according to the test length of the staple fibre so that breakage of the staple fibre occurred on average at a predetermined time of 20 seconds ±2 seconds irrespective of the test length.

When breakage of the staple fibre, occurred, which was determined electrically by a part of the apparatus constructed as described in the specification of copending U.S. patent application Ser. No. 666,208, filed Sept. 7, 1967, movement of the lower clamp arm was immediately stopped. The position of the lower clamp arm was then measured automatically in terms of the voltage of the electrical signal generated by the potentiometer mentioned above. Subtraction of the voltage of the signal produced when the lower clamp arm was in the position at which the pretensioning load was applied to the staple fibre from the final voltage gave a voltage proportional to the extension of the sample up to the point of breakage, from which a figure was automatically derived for the percentage extension of the sample of the staple fibre at breakage. The computation of the figure was accomplished using a part of the apparatus constructed as described in the specification of copending U.S. patent application Ser. No. 655,011, filed July 21, 1967.

After breakage of the staple fibre the maximum voltage of the signal from the load cell prior to breakage was electrically measured and then the voltage produced by the load cell before extension of the staple fibre was commenced was automatically subtracted from the maximum voltage to give a voltage proportional to the breaking load on the staple fibre. This was accomplished using a part of the apparatus constructed as described in the specification of copending U.S. patent application Ser. No. 655,012, filed July 21, 1967. The breaking load in grams which is proportional to that voltage difference, was automatically displayed and printed by the apparatus together with the percentage extension determined as mentioned above.

When using the method of the invention commercially for the determination of the tensile properties of filamentary materials of which the tensile properties can vary appreciably in different samples of the same material, it is preferred that a number of samples be tested and the average of the results obtained be found. The average of such results may conveniently be determined automatically using an apparatus constructed as described in the specification of copending British patent application No. 57,668/66.

Using the testing procedure described above we have been able to obtain for a tensile testing apparatus a repeatable accuracy of better than 1 percent for both the breaking load and percentage extension of filamentary materials, whereas most tensile testing apparatus used hitherto have had accuracies not even approaching this figure.

What is claimed is:
1. A method of carrying out a tensile test on a sample of filamentary material comprising the steps of:
    (a) attaching the sample of filamentary material at two positions spaced along its length to the relatively movable upper and lower arms of a tensile testing machine,
    (b) causing relative movement of said arms towards each other so as to remove any tension there might be in the sample,
    (c) measuring the initial load on the upper arm due to its own mass and that of the sample,
    (d) causing relative movement of said arms away from each other to a position at which the sample is subjected to a predetermined tensile force, as measured by the load on the upper arm,
    (e) measuring the test length of the sample in terms of the separation of the arms,
    (f) causing relative movement of the arms further away from each other to extend the sample until it breaks, and
    (g) measuring the separation of the arms and the load on the upper arm at breakage and determining the breakage load by subtracting the initial load from the load on the upper arm at breakage.

References Cited
UNITED STATES PATENTS

| | | | |
|---|---|---|---|
| 3,140,601 | 7/1964 | Weyland et al. | 73—95 X |
| 3,287,964 | 11/1966 | Dennis et al. | 73—95 |

JERRY W. MYRACLE, Primary Examiner